United States Patent
Tanaka et al.

(10) Patent No.: US 9,850,559 B2
(45) Date of Patent: Dec. 26, 2017

(54) PERMANENT MAGNET AND VARIABLE MAGNETIC FLUX MOTOR

(71) Applicant: TDK CORPORATION, Tokyo (JP)

(72) Inventors: Daisuke Tanaka, Tokyo (JP); Yasushi Enokido, Tokyo (JP)

(73) Assignee: TDK CORPORATION, Tokyo (JP)

(*) Notice: Subject to any disclaimer, the term of this patent is extended or adjusted under 35 U.S.C. 154(b) by 345 days.

(21) Appl. No.: 14/681,482

(22) Filed: Apr. 8, 2015

(65) Prior Publication Data

US 2015/0294771 A1 Oct. 15, 2015

(30) Foreign Application Priority Data

Apr. 15, 2014 (JP) ................................. 2014-083303
Sep. 30, 2014 (JP) ................................. 2014-200111

(51) Int. Cl.
*H02K 1/02* (2006.01)
*C22C 38/00* (2006.01)
(Continued)

(52) U.S. Cl.
CPC ........ *C22C 38/005* (2013.01); *C22C 33/0278* (2013.01); *C22C 38/002* (2013.01);
(Continued)

(58) Field of Classification Search
CPC ............ C22C 2202/02; C22C 33/0278; C22C 38/002; C22C 38/005; C22C 38/0005; H01F 1/057–1/0579
(Continued)

(56) References Cited

U.S. PATENT DOCUMENTS 6,132,892 A * 10/2000 Yoshikawa ............ B82Y 10/00
  204/192.2
2006/0213583 A1   9/2006 Nakamura et al.
(Continued)

FOREIGN PATENT DOCUMENTS

CN       1838342 A    9/2006
JP   2010-034522 A    2/2010
(Continued)

OTHER PUBLICATIONS

Tsunehiro, Kawata, English Translation of WO 2012/090935, Jul. 2012.*

(Continued)

*Primary Examiner* — Bernard Rojas
*Assistant Examiner* — Rashad Johnson
(74) *Attorney, Agent, or Firm* — Oliff PLC

(57) ABSTRACT

The present invention provides a permanent magnet suitable as a variable flux magnet for a variable magnetic flux motor. A permanent magnet comprising R (R is composed of 75 at % or more of Nd and 25 at % or less of at least one element selected from the group consisting of Y, Ce, La, Pr, Sm, Eu, Gd, Er, Tm, Yb and Lu), Fe and B as the main component, wherein, said permanent magnet is composed of a main phase of a crystal structure represented by $R_2Fe_{14}B$, a ratio of the element R to all constituent element satisfies 11.8 at %≤R≤12.2 at %, a cross-sectional area ratio Are of the sub-phase with a higher concentration of R than that of the main phase to the whole magnet structure satisfies 0%<Are≤1.3%, and a cross-sectional area ratio Ama of the main phase to the whole magnet structure is 97%≤Ama.

6 Claims, 1 Drawing Sheet

(51) Int. Cl.
- *H02K 1/27* (2006.01)
- *H01F 1/057* (2006.01)
- *C22C 33/02* (2006.01)

(52) U.S. Cl.
CPC ......... *H01F 1/0577* (2013.01); *H02K 1/2766* (2013.01); *C22C 2202/02* (2013.01); *H02K 1/02* (2013.01)

(58) Field of Classification Search
USPC .................................................. 310/152, 156
See application file for complete search history.

(56) References Cited

U.S. PATENT DOCUMENTS

| | | | |
|---|---|---|---|
| 2012/0169170 A1* | 7/2012 | Sakurada | C22C 38/005 310/152 |
| 2013/0099150 A1* | 4/2013 | Nakajima | C22C 38/005 252/62.51 R |
| 2013/0154424 A1* | 6/2013 | Nakajima | C22C 33/0278 310/152 |
| 2013/0162089 A1 | 6/2013 | Komuro et al. | |
| 2013/0241682 A1* | 9/2013 | Horiuchi | H01F 1/0557 335/302 |
| 2013/0271249 A1 | 10/2013 | Suzuki et al. | |
| 2014/0311288 A1* | 10/2014 | Enokido | H01F 1/0536 75/246 |
| 2015/0294770 A1* | 10/2015 | Tanaka | C22C 28/00 310/152 |
| 2017/0117094 A1* | 4/2017 | Nozawa | H01F 41/0266 |

FOREIGN PATENT DOCUMENTS

| | | | | |
|---|---|---|---|---|
| JP | WO 2012090935 A1 * | 7/2012 | ........ | C01G 49/0054 |
| JP | 2013-034317 A | 2/2013 | | |
| JP | 2013-135542 A | 7/2013 | | |
| JP | EP 2660829 A1 * | 11/2013 | ................ | B22F 3/10 |
| WO | 2011/030387 A1 | 3/2011 | | |
| WO | 2012/090765 A1 | 7/2012 | | |

OTHER PUBLICATIONS

Aug. 5, 2014 Office Action issued in Japanese Application No. 2014-083303.

* cited by examiner

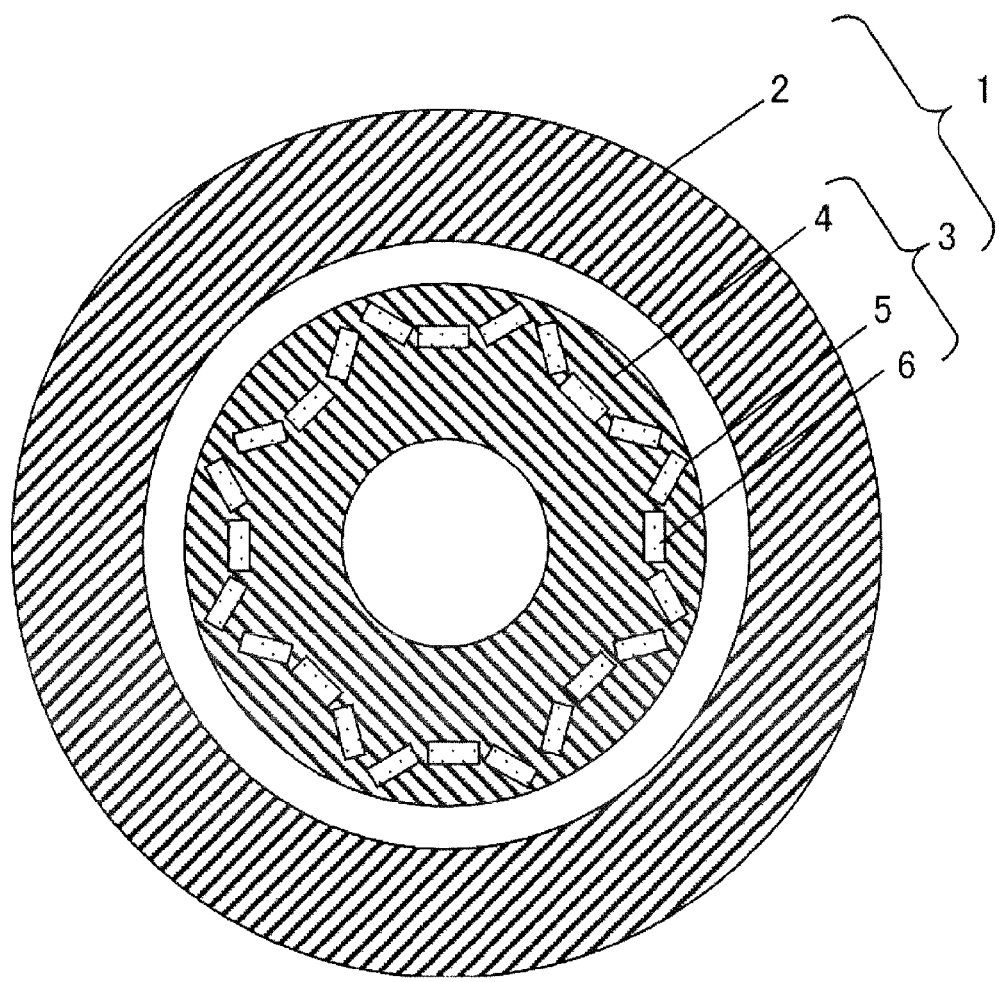

PERMANENT MAGNET AND VARIABLE MAGNETIC FLUX MOTOR

The present invention relates to a permanent magnet and a variable magnetic flux motor using thereof. Especially, the present invention relates to a permanent magnet applicable to a variable magnetic flux and a motor using thereof.

BACKGROUND

Recently, environment and energy problems are more and more significant in the world, and the demands to save energy in various systems are more and more increasing. The motor drive system is required to have multiple functions, high performance and energy-saving and the operation with variable speed is developing. The variable magnetic flux motor, in which magnetization of the permanent magnet can change directly, has been thought out as a solution of the technology (see Patent Document 1).

Two kinds of magnets, i.e., a variable flux magnet and a fixed flux magnet, are used in the variable magnetic flux motor. The fixed flux magnet is required to have properties, i.e., a high residual magnetic flux density and a high coercivity which will not deteriorate due to inverter current on the condition of high torque, and the requirement is the same as that of a conventional permanent magnet synchronous motor. In addition, the variable magnetic flux motor is demagnetized through a current magnetic field in order to inhibit the increase of back electromotive force that will prevent roll controlling during revolution at a high speed, and the motor is remagnetized through the current magnetic field when the torque is needed during the operation. Thus, the variable flux magnet has the function of demagnetization and magnetization. When the magnetization state is controlled by a small applied magnetic field, it is expected that much less consumption of the variable magnetic flux motor can be realized. Further, in order to obtain a high output and a high efficiency of the variable magnetic flux motor, the variable flux magnet is required to provide a magnetic flux equal to that of the fixed flux magnet. That is, the variable flux magnet is required to have magnetic properties, i.e., a low coercivity and a high residual magnetic flux density.

For example, a Sm—Co based permanent magnet has been disclosed as a variable flux magnet (Patent Document 2). The improvement of the efficiency of the motor can be realized by combining the structure of an Nd—Fe—B based permanent magnet with a high coercivity, as a fixed flux magnet, in the way of not being demagnetized by load current.

PATENT DOCUMENT

Patent Document 1: JP 2013-34317A
Patent Document 2: JP 2010-34522A

SUMMARY

However, in the case that the Sm—Co based permanent magnet is used as a variable flux magnet, the residual magnetic flux density Br (about 10 kG) cannot reach that of the conventional Nd—Fe—B based permanent magnet (about 13 kG) which is a fixed flux magnet, which leads to the decrease of the output and the efficiency of the motor.

The present invention is made to solve the technical problem mentioned above. The present invention aims to provide a variable magnetic flux permanent magnet with high properties which has a Br equal to that of the fixed flux magnet and the necessary applied external magnetic field is small when controlling the magnetization state. And it aims to provide a variable magnetic flux motor using the permanent magnet mentioned above.

In order to solve the above technical problem and achieve the aim of the present invention, the permanent magnet of the present invention is characterized in that it comprises R (R is composed of 75 at % or more of Nd and 25 at % or less of at least one element selected from the group consisting of Y, Ce, La, Pr, Sm, Eu, Gd, Er, Tm, Yb and Lu according to the ratio in R), Fe and B as the main component, and it is composed of a main phase of a crystal structure represented by $R_2Fe_{14}B$. Besides, the ratio of the element R relative to the all constituent elements satisfies 11.8 at$\leq R \leq$12.2 at %, and the cross-sectional area ratio Are of the subphase with a higher concentration of R than the main phase satisfies 0%<Are$\leq$1.3% relative to the whole structure of the magnet. Moreover, the cross-sectional area ratio of the main phase to the whole structure of the magnet Ama is 97%$\leq$Ama.

With such a structure, a variable flux magnet with a low coercivity and a high residual magnetic flux density which is applicant to a variable magnetic flux motor can be obtained compared to the conventional R—Fe—B based permanent magnet because the influence of the magnetic separation caused by the R-rich phase with higher concentration of R than that of the main phase is reduced and the main phase represented by $R_2Fe_{14}B$ is present with a high proportion.

In addition, the present invention provides a variable magnetic flux motor having the above permanent magnet as the variable flux magnet. The variable flux magnet motor of the present invention has a high output and a high efficiency because of having the variable flux magnet with the above properties and a fixed flux magnet with a high residual magnetic flux density and a high coercivity.

According to the present invention, it can provide a variable flux magnet whose magnetic force can be reversibly changed due to a small external magnetic field, and a variable magnetic flux motor having thereof.

DETAILED DESCRIPTION OF EMBODIMENTS

Hereinafter, the embodiments of the present invention will be described in detail with reference to the drawing according to the different situations. Further, the present invention is not limited by the following embodiments and examples. In addition, the constituent elements in the following embodiments and examples include those easily thought of by those skilled in the art, those substantially the same and those having the equivalent scopes. Besides, the constituent elements disclosed in the following embodiments and examples can be appropriately combined or can be properly selected.

Firstly, the preferable permanent magnet according to the present embodiment is described. The permanent magnet according to the present embodiment comprises R, Fe and B as the main component and it is composed of the main phase with the crystal structure represented by $R_2Fe_{14}B$. In the present embodiment, R comprises Nd and at least one element selected from the group consisting of Y, Ce, La, Pr, Sm, Eu, Gd, Er, Tm, Yb and Lu, which are rare earth elements. Here, R can contain the impurities derived from the materials or the other components mixed during the production process. The ratio of Nd occupies 75 at % or more in the R. If the content of Nd is less than 75%, the residual magnetic flux density tends to decrease. Besides, at least one element selected from the group consisting of Y, Ce, La, Pr, Sm, Eu, Gd, Er, Tm, Yb and Lu can be contained as the element except Nd, and it/they can occupy 25 at % or less in the R. From the viewpoint of not decreasing the residual magnetic flux density and deteriorating the coercivity, Ce, Y and La are preferable.

The permanent magnet according to the present embodiment contains 11.8 at % to 12.2 at % of the element R. Thus, the sufficient main phase for maintaining the high residual magnetic flux density, and the R-rich phase for inhibiting the high coercivity can be formed in a good balance. If the content of R is less than 11.8 at %, the formation of the $R_2Fe_{14}B$ phase that is the main phase in the permanent magnet will not be sufficient. In addition, if the content of R exceeds 12.2 at %, the R-rich phase increases, which leads to the increase of the coercivity.

The permanent magnet according to the present embodiment contains 5 to 8 at % of B. When the content of B is less than 5 at %, the formation of the $R_2Fe_{14}B$ phase that is the main phase in the permanent magnet will not be sufficient. On the other hand, if the content of B is more than 8 at %, the residual magnetic flux density tends to decrease. Hence, the upper limit of B is set as 8 at %. In order to form the main phase with a sufficient amount for maintaining the high residual magnetic flux density and form the R-rich phase for inhibiting the high coercivity, the content of B is preferred to be 5.2 to 6.2 at %. The part of B can be replaced by C, and the replacement amount of C is preferable 10 at % or less relative to B.

The permanent magnet according to the present embodiment contains 73 to 83% of Fe. If the content of Fe is less than 73 at %, the residual magnetic flux density tends to reduce. In addition, if the content of Fe exceeds 83 at %, the formation of the $R_2Fe_{14}B$ phase that is the main phase in the permanent magnet will not be sufficient. The part of Fe also can be replaced by Co. The replacement amount of Co is preferable 15 at % or less relative to Fe. The phase formed by Co is the same as that formed by Fe. It is effective to increase the Curie temperature and decrease the coercivity when the replacement amount of Co is 15 at % or less.

The permanent magnet according to the present invention may contain the other elements. The elements such as Zr, Ti, Bi, Sn, Ga, Nb, Ta, Si, V, Ag, Ge or the like can be properly contained.

The permanent magnet according to the present invention contains 1.0 to 3.5 mg/g of C. Thus, the residual magnetic flux density can be maintained and the coercivity can be decreased. The present inventors consider it is because the compound can be formed by C and R at the surface or the boundary of the grains of the main phase, and the defects which become the start of the reverse magnetic domains of the main phase can be easily formed. However, when the amount of C is less than 1.0 mg/g, there is almost no compound containing C, and the defects of the main phase, which can decrease the coercivity, will not be formed. In the case that the amount of C is more than 3.5 mg/g, the amount of the compound containing C increases and thus the residual magnetic flux density reduces. In addition, the above effect is more easily achieved by the means of the average particle size of the main phase being 1.0 to 2.5 μm. The present inventors consider that it is because superficial area of the grains of the main phase increases and C is easy to get in touch with the grains of the main phase.

As for the permanent magnet according to the present embodiment, a protective film can be formed on the surface of the magnet body. The protective film according to the present embodiment is not particularly limited, but the protective film formed by electrolytic plating is particularly preferable. Any one of Ni, Ni—P, Cu, Zn, Cr, Sn and Al can be used as the material for electrolytic plating. The protective film formed by electrolytic plating is the typical one according to the present embodiment, but the protective film formed by the other method also can be coated. As the protective film formed by the other method, any one of resin coating or chemical treatment such as electroless plating and chromate treatment can be applied or the combination thereof can be employed. The thickness of the protective film can be adjusted according to the size of the rare earth based sintered magnet body, the level of the required corrosion resistance and the like. It can be properly determined at the range of 1 to 100 μm. The thickness of the protective film is preferable 1 to 50 μm.

Hereinafter, the preferable preparation method of the permanent magnet according to the present embodiment will be described. In the preparation of the permanent magnet in the present embodiment, firstly, the alloy raw material(s) will be prepared with which an R-T-B based magnet with the desired composition can be obtained. The alloy raw material(s) can be prepared by the strip casting method or other well known melting methods under vacuum or at an inert atmosphere, preferably at Ar atmosphere. In the strip casting method, the molten liquid obtained by melting the starting metal(s) at a non-oxidative atmosphere such as Ar atmosphere is sprayed to the surface of the rotating roll. The molten liquid quenched on the roll will be condensed into a thin plate or a sheet (a scale-like shape). The peripheral velocity of the roll is preferable within the range of 0.3 to 15 m/s, and more preferable within the range of 0.5 to 12 m/s. When the peripheral velocity is extremely low, un-uniform of α-Fe or alloy will be easily resulted in. Besides, in the case of the peripheral velocity being extremely high, the crystal grains will be small and equiaxed chill crystal will be generated, and thus good magnetic properties can not be obtained. The quenched and condensed alloy is provided with a sheet having a thickness of 0.1 to 1 mm, and the quenched and condensed alloy has a uniform structure with a grain diameter of 1 to 50 μm. The method for preparing the alloy raw material is not limited to the strip casting method, and the alloy raw material can also be obtained by melting methods such as the high frequency induction melting method. Further, in order to prevent from segregation after the melting process, for example, the molten liquid can be poured on a water cooled copper plate so as to be solidified. Also, the alloy obtained by the reduction diffusion method can be used as the alloy raw material.

In the case of obtaining the R—Fe—B based permanent magnet in the present invention, as for the alloy raw materials, the so-called single-alloy method for manufacturing a sintered magnet from one kind of alloy may be substantially used. The so-called two-alloy method using an alloy regarding $R_2Fe_{14}B$ grains as main body (low-R alloy) and an alloy containing more R than the low-R alloy (high-R alloy) is not suitable since the grain boundary phase having a high content of R will be formed at the boundary and the increase of the coercivity will be caused.

The alloy raw material is subjected to a pulverization process. The pulverization process includes a coarse pulverization step and a fine pulverization step. Firstly, the alloy raw material is pulverized until a particle diameter of approximately several hundred μm. The coarse pulverization is preferably performed by using a coarse pulverizer such as a stamp mill, a jaw crusher, a Brown mill and the like in the atmosphere of an inert gas. Before coarse pulverization, it is effective that hydrogen is adsorbed in the raw alloy, and then the hydrogen is released in order to perform pulverization.

The purpose of hydrogen-releasing treatment is to reduce the hydrogen to be the impurities in the rare earth-based sintered magnet. The maintained heating temperature to hydrogen adsorbed is set to be 200° C. or more, preferably 350° C. or more. The holding time depends on the relation with maintained temperature, the thickness of the raw alloy and etc., and it is set to be at least 30 min or more, preferably 1 hour or more. The hydrogen-releasing treatment is preformed in vacuum or in the airflow of Ar. Further, hydrogen-adsorbing treatment and hydrogen-releasing treatment is not necessary treatment. The hydrogen pulverization can be defined as the coarse pulverization to omit a mechanical coarse pulverization.

After the coarse pulverization, the fine pulverization is performed. During the fine pulverization, a jet mill is mainly used for dry pulverization to pulverize the coarse pulverized powder having a particle diameter of approximately several hundred μm to be a powder with a particle diameter of 1 to 6 μm, preferably 3 to 5 μm. The pulverization is carried out through the jet mill, in which the jet mill discharges inert gas from a narrow nozzle at high pressure and produces high speed airflow, and then the coarse pulverized powder is accelerated with the high speed airflow, causing a collision between coarse pulverized powders each other or a collision between coarse pulverized powders and a target or a container wall. He, $N_2$, Ar or the like can be selected as the inert gas for pulverization. In addition, a lubricant can be added in order to prevent powders from aggregating during the pulverization, improve the flowability, enhance the lubrication or the orientation during molding, and adjust the amount of C. The lubricant such as zinc stearate, calcium stearate, aluminum stearate, magnesium stearate, stearamide, oleamide, erucamide, methylenebis(stearic amide), ethylenebis(stearic amide), paraffin, naphthalene or the like can be selected. The additive amount of the lubricant is preferable 0.01 to 0.5 wt % relative to the coarse pulverized powder for pulverization.

The wet pulverization also can be applied in the fine pulverization. In the wet pulverization, a ball mill, wet attritor or the like can be used to pulverize the coarse pulverized powder having a particle diameter of approximately several hundred μm to be a fine pulverized powder with a particle diameter of 0.1 to 5 μm, preferably 2 to 4.5 μm. The slurry is produced by choosing an appropriate dispersion medium in the wet pulverization. The pulverization is performed without the powder of the magnet exposed to oxygen, so the fine powder with low oxygen concentration can be obtained. The dispersion medium such as isopropyl alcohol, ethanol, methanol, ethyl acetate, phosphate ester, pentane, hexane, benzene, toluene, xylene, acetone, methyl ethyl ketone or the like can be chosen. The concentration of the slurry can be 1 to 50 wt %, preferably 20 to 45 wt %.

The fine powder is subjected to a molding process in a magnetic field. In the molding process in a magnetic field, the molding pressure may be set to be in a range of 0.3 to 3 ton/cm$^2$ (30 to 300 MPa). The molding pressure can be constant or incremental or degressive from the start to the end of the molding process. Or, the pressure can be randomly changed. The lower the molding pressure is, the better the orientation is. However, if the molding pressure is much too low, the strength of the molded body will be insufficient, which will cause problems in the handling. Thus, the molding pressure is to be selected within the range mentioned above. The molded body obtained in the molding process in a magnetic field will usually have a final relative density of 40 to 60%.

The applied magnetic field can be made to be around 10 to 20 kOe (960 to 1600 kA/m). The applied magnetic field is not limited to be a static magnetic field. A pulsed magnetic field can also be used. Further, the static magnetic field and the pulsed magnetic field can be used in combination.

Subsequently, the molded body is sintered in a vacuum or an inert gas atmosphere. A sintering temperature is required to be adjusted considering many conditions, such as composition, pulverization method, a difference of average particle diameter and grain size distribution and the like. The sintering process may be performed at a temperature of 1000 to 1200° C. for 1 to 20 hours. If the sintering time is less than 1 hour, densification will be insufficient. Additionally, if the molded body is sintered for 20 hours or more, bad influence on magnetic properties is brought out due to abnormal grain growth or formation of the hetero-phase.

After the sintering process, the obtained sintered body is subjected to an aging treatment. The aging treatment is effective to adjust the coercivity. It is difficult for the variable flux magnet used for the variable magnetic flux motor to reduce to the proper coercivity in the aging treatment, which is different from the case of the usual Nd—Fe—B based permanent magnet that aims to achieve high coercivity.

The sintered body subjected to the above treatment is cut into the desired size and shape. The processing method of the surface of the sintered body is not particularly limited, and the mechanical processing can be carried out. As for the mechanical processing, for example, polishing treatment using a whetstone can be listed.

Further, the protective film can be formed on the surface of the sintered body in necessary. The formation of the protective film can be performed by the well known method according to the species of the protective film. For example, in the case of using electrolytic plating, the conventional method i.e., defatting, water washing, etching (such as by nitric acid), water washing, film formation through electrolytic plating, water washing, and then drying can be adopted. The defatting and chemical etching by acids can be applied to cleanse the surface of the sintered body. As a plating bath used in the electrolytic plating of Ni, Watt's bath without nickel chloride (i.e., nickel sulfate and boric acid can be contained as the main components), sulfamine acid bath, boron fluoride bath, nickel bromide or the like can be listed. However, in this case, as anodic dissolution becomes less, nickel ion is preferably supplemented in the bath. The nickel ion is preferably supplemented as the solution of nickel sulfate or nickel bromide.

Hereinafter, the variable magnetic flux motor according to the present embodiment will be described. FIG. 1 is a cross-section view showing the embodiment of the variable magnetic flux motor according to the present invention. In the variable magnetic flux motor shown in FIG. 1, the rotor 3 is disposed inside the stator 2. In the iron core 4 inside the rotor 3, the fixed flux magnet 5 (using a permanent magnet with a high residual magnetic flux density and a high coercivity) and the variable flux magnet 6 (using the permanent magnet with a high residual magnetic flux density and a low coercivity in the present embodiment) are disposed. The magnetized coil (not shown) is disposed in the rotor 3. The current is flowed from the magnetized circuit to the magnetized coil. Thus, the magnetic field can directly work on the variable flux magnet 6, and the structure with variable magnetic flux density (magnetic flux) is formed.

EXAMPLES

Hereinafter, the present invention will be described in detail based on examples and comparative examples. However, the present invention is not limited to the examples described below.

Example 1

The composition of the raw alloy was basically 11.8 at % of R, 5.4 at % of B and the balance of Fe. R was set to be Nd. Nd, Fe and FeB with the purity of 99.9% were combined to be the above composition. The raw alloy sheets were melt and casted by the strip casting method.

The obtained raw alloy sheets were pulverized by means of hydrogen to obtain coarse pulverized powder. Oleamide was added to the coarse pulverized powder as a lubricant. Then, a fine pulverization was performed under high pressure in the atmosphere of $N_2$ gas by using a jet mill to obtain a fine pulverized powder. The particle diameter of the obtained fine powder was measured by a particle size distribution meter. As a result, the value of D50 was 4 μm.

Subsequently, the produced fine pulverized powder was molded in a magnetic field of 15 kOe at a pressure of 140 MPa to obtain a molded body with the size of 20 mm×18 mm×13 mm. The direction of the magnetic field was vertical to pressing direction. The obtained molded body was fired at 1030° C. for 6 hours. Next, the aging treatment was performed at 600° C. for 1 hour to get a sintered body.

The magnetic properties of the obtained sintered body were measured by a B-H tracer. Firstly, the sufficient external magnetic field was applied at the positive and negative direction so as to provide the sintered body with magnetic saturation, and then magnetization-magnetic field curve (i.e., full-loop) was measured to calculate the residual magnetic flux density Br and the coercivity HcJ. Next, after the specified magnetic field was applied at the negative direction, the magnetic field reaching saturation was applied at the positive direction, and then the magnetization-magnetic field curve (i.e., full-loop) was measured. The repeated measurements were provided with the specified magnetic field applied at the negative direction increased gradually so as to find out the external magnetic field Hex when the residual magnetic flux density Br became 0. The result obtained is shown in Table 1.

It was confirmed by the X-ray diffraction analysis whether most of the formation phase was tetragonal structure represented by $R_2Fe_{14}B$ in the obtained sintered body.

Moreover, the sintered body was buried in an epoxy resin, and its cross-section was grinded. The available sand paper was used during grinding. The sand paper was used from low type to higher one to grind. Finally, a buff and diamond particles were adopted to grind. At this moment, the grinding was performed without water in order to prevent the components in the grain boundary phase from corroding.

FE-SEM (i.e., field-emission scanning electron microscope) was used to observe the backscattered electron images of the cross-section of the sintered body after burying in the resin and grinding. In addition, EDS (energy dispersive X-ray spectrometer) attached in FE-SEM was used to confirm the composition of the constituent phase. It was confirmed in the obtained sintered body that R-rich phase having higher concentration of R than that in the main phase was present besides the main phase with the tetragonal structure represented by $R_2Fe_{14}B$. A threshold value was set based on the difference of the color in the backscattered electron image of FE-SEM so that the constituent phases were classified. The ratio Ama of the main phase to the whole magnet structure and the ratio Are of the R-rich phase to the whole magnet structure in the cross-section of the magnet were calculated through image analysis. Here, the whole magnet structure meant main phase, sub-phase except the main phase, and hole. The results were shown in Table 1.

Example 2

The permanent magnet was produced by the same method as that in Example 1 except that the R in the composition of the raw alloy was 12.0 at %. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Example 3

The permanent magnet was produced by the same method as that in Example 1 except that the R in the composition of the raw alloy was 12.2 at %. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 1

The permanent magnet was produced by the same method as that in Example 1 except that the R in the composition of the raw alloy was 11.2 at %. Also, Br, HcJ and Hex were calculated according to the measurement results obtained by the B-H tracer with the same method as that in Example 1. Next, the structure of the constituent phase of the sintered body obtained by the same method as that in Example 1 was observed. As a result, it was different from those in Examples 1 to 3, and the structure of α-Fe was found out besides the structure $R_2Fe_{14}B$ of the major formation phase. Further, Ama and Are were calculated according to the results of FE-SEM and EDS. The results were shown in Table 1.

Comparative Example 2

The permanent magnet was produced by the same method as that in Example 3 except that the B in the composition of the raw alloy was 6.4 at %. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 3

The permanent magnet was produced by the same method as that in Example 1 except that the R in the composition of the raw alloy was 12.6 at %. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 4

The permanent magnet was produced by the same method as that in Example 1 except that the R in the composition of the raw alloy was 13.3 at %. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 5

The permanent magnet was produced by the same method as that in Example 1 except that the R in the composition of the raw alloy was 14.3 at %. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Example 4

The permanent magnet was produced by the same method as that in Example 1 except that the R in the composition of the raw alloy was 12.0 at % and the composition of the R was Nd75 at %-Ce25%. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 6

The permanent magnet was produced by the same method as that in Example 1 except that the R in the composition of the raw alloy was 12.0 at % and the composition of the R was Nd70 at %-Ce30%. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 7

The permanent magnet was produced by the same method as that in Example 1 except that the R in the composition of the raw alloy was 12.0 at % and the composition of the R was Nd50 at %-Ce50%. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Example 5

The permanent magnet was produced by the same method as that in Example 1 except that the R in the composition of the raw alloy was 12.0 at % and the composition of the R was Nd75 at %-Y25%. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 8

The permanent magnet was produced by the same method as that in Example 1 except that the R in the composition of the raw alloy was 12.0 at % and the composition of the R was Nd70 at %-Y30%. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 9

The permanent magnet was produced by the same method as that in Example 1 except that the R in the composition of the raw alloy was 12.0 at % and the composition of the R was Nd50 at %-Y50%. Also, Br, HcJ and Hex were calculated according to the measurement results obtained by the B-H tracer with the same method as that in Example 1. Then, the phases of the sintered body obtained by the same method as that in Example 1 were observed. As a result, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Example 6

The permanent magnet was produced by the same method as that in Example 1 except that the R in the composition of the raw alloy was 12.0 at % and the composition of the R was Nd75 at %-La25%. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 10

The permanent magnet was produced by the same method as that in Example 1 except that the R in the composition of the raw alloy was 12.0 at % and the composition of the R was Nd70 at %-La30%. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

Comparative Example 11

The permanent magnet was produced by the same method as that in Example 1 except that the R in the composition of the raw alloy was 12.0 at % and the composition of the R was Nd50 at %-La50%. Also, Br, HcJ and Hex were calculated according to the measurement results obtained by the B-H tracer with the same method as that in Example 1. Then, it was confirmed that the sintered body obtained by the same method as that in Example 1 was composed of the R-rich phase and the main phase having the tetragonal structure of $R_2Fe_{14}B$. After that, Ama and Are were calculated according to the results of FE-SEM and EDS. The results were shown in Table 1.

If Examples 1 to 3 and Comparative Examples 1 to 5 in Table 1 were compared, the magnetic properties of HcJ≤5 kOe and Br≥13 kOe which were suitable for the variable flux magnet could be obtained with the range of 11.8 at %≤R≤12.2 at % and the range of 0%<Are≤1.3% and 97%≤Ama. It was considered that when the range in the magnet fell is in the above range, the influence of magnetic separation caused by the R-rich phase in the conventional R—Fe—B magnet was reduced with HcJ decreased and the main phase of $R_2Fe_{14}B$ was present with an extremely high proportion, which results in maintaining a high Br. When the amount of R was less than 11.8 at %, both Br and HcJ sharply decreased and the magnetic properties suitable for the variable flux magnet could not be achieved. This was considered that the amount of R was low and thus the formation of the main phase with the structure of $R_2Fe_{14}B$ was not sufficient. In addition, when the amount of R was more than 12.2 at %, since the amount of the R-rich phase became more and magnetic separation was improved, HcJ of the magnet was more than 5 kOe and Hex became 10 kOe or more. Thus, it was not suitable for the variable flux magnet because it was hard to apply high applied magnetic field to control magnetization state in the actual application environment.

Moreover, if Comparative Examples 6 to 7 and Examples 2, 4 in which the amount of R was 12.0 at % and Nd was replaced by Ce in the composition of R, were compared, HcJ were, further reduced when increasing the amount of Ce which replaces Nd. However, Br tended to decrease at the same time, and 13 kG or more of Br suitable for the variable flux magnet could not be achieved when 50% of Nd was replaced by Cc. Therefore, it was known that the permanent magnet with a high residual magnetic flux density and a low coercivity suitable as the variable flux magnet for the variable magnetic flux motor could be obtained when the replacement amount of Ce fell within the range of 25% or less. In the Examples 5 to 6 and Comparative Examples 8 to 11 in which Nd was replaced by the rare earth element Y and La instead of Ce, the same tendency was shown. Besides, in the case of Examples 4 to 6 in which Nd was replaced by the above rare earth element with the above range, the ratio of Hex to HcJ was smaller than that in Example 2 with Nd100%, and it is easy to control the magnetization state by means of the external magnetic field. Thus, the permanent magnet could be obtained which was more suitable as the variable magnet for the variable magnetic flux motor.

TABLE 1

| | Composition of R | Amount of R (at %) | Ama (%) | Are (%) | HcJ (kOe) | Hex (kOe) | Br (kG) |
|---|---|---|---|---|---|---|---|
| Comparative Example 1 | Nd | 11.2 | 94.3 | 0 | 0.1 | — | 11.3 |
| Example 1 | Nd | 11.8 | 99.2 | 0.1 | 1.8 | 3.7 | 14.5 |
| Example 2 | Nd | 12.0 | 98.6 | 0.5 | 2.7 | 5.5 | 14.4 |
| Example 3 | Nd | 12.2 | 97.0 | 0.9 | 3.9 | 8.1 | 14.2 |
| Comparative Example 2 | Nd | 12.2 | 96.0 | 2.2 | 5.6 | 10.2 | 13.9 |
| Comparative Example 3 | Nd | 12.6 | 96.2 | 2.1 | 5.3 | 11.1 | 13.9 |
| Comparative Example 4 | Nd | 13.3 | 95.4 | 2.4 | 6.8 | 13.9 | 13.8 |
| Comparative Example 5 | Nd | 14.3 | 93.2 | 3.0 | 10.7 | 18.3 | 13.5 |
| Example 4 | Nd0.75Ce0.25 | 12.0 | 97.2 | 0.9 | 2.5 | 3.0 | 13.3 |
| Comparative Example 6 | Nd0.70Ce0.30 | 12.0 | 96.7 | 1.1 | 2.3 | 2.7 | 12.8 |
| Comparative Example 7 | Nd0.5Ce0.5 | 12.0 | 95.9 | 2.1 | 1.9 | 2.3 | 10.7 |
| Example 5 | Nd0.75Y0.25 | 12.0 | 97.0 | 1.3 | 2.4 | 2.9 | 13.7 |
| Comparative Example 8 | Nd0.7Y0.3 | 12.0 | 96.3 | 0.9 | 1.6 | 1.9 | 12.9 |

TABLE 1-continued

|  | Composition of R | Amount of R (at %) | Ama (%) | Are (%) | HcJ (kOe) | Hex (kOe) | Br (kG) |
|---|---|---|---|---|---|---|---|
| Comparative Example 9 | Nd0.5Y0.5 | 12.0 | 96.4 | 0.4 | 0.5 | 0.6 | 12.2 |
| Example 6 | Nd0.75La0.25 | 12.0 | 97.1 | 0.8 | 2.1 | 2.5 | 13.2 |
| Comparative Example 10 | Nd0.7La0.3 | 12.0 | 96.9 | 0.8 | 1.7 | 2.1 | 12.9 |
| Comparative Example 11 | Nd0.5La0.5 | 12.0 | 96.9 | 1.0 | 1.3 | 1.6 | 12.5 |

*- in the Hex column means that the external magnetic field could not be controlled.

As described above, the permanent magnet according to the present invention has a high residual magnetic flux density and its magnetic force can reversibly changed via a small external magnetic field. Thus, such a permanent magnet can be suitably used as a variable flux magnet for a variable magnetic flux motor which can provide a high efficiency in the operation of people's livelihood, industries and conveyer equipments where variable speed is needed.

BRIEF DESCRIPTION OF THE DRAWINGS

FIG. 1 is a cross-section view showing the variable magnetic flux motor according to the present invention.

DESCRIPTION OF REFERENCE NUMERALS

1 Variable magnetic flux motor
2 Stator
3 Rotor
4 Iron core
5 Fixed flux magnet
6 Variable flux magnet

What is claimed is:

1. A permanent magnet comprising R, Fe and B as the main component,
wherein, R is composed of 75 at % or more to 100 at % or less of Nd and 0 at % or more to 25 at % or less of at least one element selected from the group consisting of Y, Ce, La, Pr, Sm, Eu, Gd, Er, Tm, Yb and Lu,
said permanent magnet is composed of a main phase of a crystal structure represented by $R_2Fe_{14}B$,
a ratio of the element R to all constituent element falls within the range of 11.8 at %≤R≤12.2 at %,
a cross-sectional area ratio Are of the sub-phase with a higher concentration of R than that of said main phase to the whole magnet structure satisfies 0%<Are≤1.3%, and
a cross-sectional area ratio Ama of said main phase to the whole magnet structure satisfies 97%≤Ama.

2. A variable magnetic flux motor comprising the permanent magnet according to claim 1 as a variable flux magnet.

3. A permanent magnet according to claim 1, wherein, the cross-sectional area ratio Are of the sub-phase with a higher concentration of R than that of said main phase to the whole magnet structure satisfies 0.1%≤Are≤1.3%.

4. A permanent magnet according to claim 1, wherein, the cross-sectional area ratio Ama of said main phase to the whole magnet structure satisfies 97.0%≤Ama≤99.2%.

5. A permanent magnet according to claim 1, wherein, R is composed of 75 at % or more to 100 at % or less of Nd and 0 at % or more to 25 at % or less of at least one element selected from the group consisting of Y, Ce, and La.

6. A permanent magnet according to claim 1, wherein, the permanent magnet has magnetic properties of HcJ≤5 kOe and Br≥13 kOe.

* * * * *